(12) United States Patent
Cade

(10) Patent No.: US 7,966,276 B2
(45) Date of Patent: Jun. 21, 2011

(54) CONTROLLER FOR PARTIALLY OBSERVABLE SYSTEMS

(75) Inventor: Neil Alexander Cade, Rickmansworth (GB)

(73) Assignee: BAE Systems, London (GB)

( * ) Notice: Subject to any disclaimer, the term of this patent is extended or adjusted under 35 U.S.C. 154(b) by 36 days.

(21) Appl. No.: 11/884,565

(22) PCT Filed: Jul. 10, 2007

(86) PCT No.: PCT/GB2007/050391
§ 371 (c)(1), (2), (4) Date: May 29, 2009

(87) PCT Pub. No.: WO2008/007137
PCT Pub. Date: Jan. 17, 2008

(65) Prior Publication Data
US 2009/0299496 A1    Dec. 3, 2009

(30) Foreign Application Priority Data

Jul. 13, 2006  (GB) .................................. 0613955.4

(51) Int. Cl.
G06F 17/00 (2006.01)
G06F 15/18 (2006.01)
G06F 19/00 (2011.01)
G06F 11/00 (2006.01)
G06F 7/60 (2006.01)
G06F 17/10 (2006.01)
G06N 5/02 (2006.01)
G06N 3/08 (2006.01)
G05B 13/02 (2006.01)

(52) U.S. Cl. ................ 706/47; 706/14; 706/25; 700/47; 700/49; 700/104; 714/26; 703/2

(58) Field of Classification Search .................. 700/28, 700/29, 44, 45, 108, 47, 49, 104; 702/182–185, 702/189; 703/2; 706/10, 14, 25, 45–48, 59–61; 714/26
See application file for complete search history.

(56) References Cited

U.S. PATENT DOCUMENTS
5,608,843 A * 3/1997 Baird, III ........................ 706/25
(Continued)

OTHER PUBLICATIONS

Andrieu C. et al., "Particle Methods for Change Detection, System Identification, and Control" Proceedings of the IEEE, New York, US, vol. 92:3, Mar. 2004, pp. 423-438.*

(Continued)

Primary Examiner — Crystal J Barnes-Bullock
(74) Attorney, Agent, or Firm — Kenyon & Kenyon LLP (57) ABSTRACT

A controller is provided, operable to control a system on the basis of measurement data received from a plurality of sensors indicative of a state of the system, with at least partial autonomy, but in environments in which it is not possible to fully determine the state of the system on the basis of such sensor measurement data. The controller, includes: a system model, defining at least a set of probabilities for the dynamical evolution of the system and corresponding measurement models for the plurality of sensors of the system; a stochastic estimator operable to receive measurement data from the sensors and, with reference to the system model, to generate a plurality of samples each representative of the state of the system; a rule set corresponding to the system model, defining, for each of a plurality of possible samples representing possible states of the system, information defining an action to be carried out in the system; and an action selector, operable to receive an output of the stochastic estimator and to select, with reference to the rule set, information defining one or more corresponding actions to be performed in the system.

9 Claims, 3 Drawing Sheets

U.S. PATENT DOCUMENTS

| | | | |
|---|---|---|---|
| 5,864,773 A * | 1/1999 | Barna et al. | 702/85 |
| 6,353,815 B1 | 3/2002 | Vilim | |
| 6,564,176 B2 * | 5/2003 | Kadtke et al. | 702/189 |
| 6,738,682 B1 * | 5/2004 | Pasadyn | 700/100 |
| 6,823,675 B2 * | 11/2004 | Brunell et al. | 60/773 |
| 6,868,310 B2 * | 3/2005 | Nasman et al. | 700/291 |
| 6,917,925 B2 * | 7/2005 | Berenji et al. | 706/10 |
| 7,085,615 B2 * | 8/2006 | Persson et al. | 700/108 |
| 7,296,007 B1 * | 11/2007 | Funge et al. | 706/47 |
| 7,363,515 B2 * | 4/2008 | Frazier et al. | 703/2 |
| 7,536,595 B1 * | 5/2009 | Hiltunen et al. | 714/26 |
| 7,539,597 B2 * | 5/2009 | Wegerich et al. | 702/185 |
| 2004/0124012 A1 | 7/2004 | Dunlop | |

OTHER PUBLICATIONS

Greenfield et al., "Adaptive Control of Nonlinear Stochastic Systems by Particle Filtering" Control and Automation, 2003. ICCA. Final Program and Book of Abstracts. The Forth International Conference on Jun. 10-12, 2003, Piscataway, NJ, USA, IEEE, Jun. 10, 2003, pp. 887-890.*

K. R. Joshi et al., "Automatic Recovery Using Bounded Partially Observable Markov Decision Processes", International Conference on Dependable Systems and Networks, Jun. 25-28, 2006, pp. 445-456.*

Xi-Ren Cao et al., "Partially observable Markov decision processes with reward information", 43rd IEEE Conference on Decision and Control, 2004, vol: 4, pp. 4393-4398.*

P. Laroche et al., "Mobile Robotics Planning using Abstract Markov Decision Processes", 11th IEEE International Conference on Tools with Artificial Intelligence Proceedings, Nov. 9, 1999-Nov. 11, 1999, pp. 299-306.*

International Search Report, Oct. 22, 2007, from International Patent Application No. PCT/GB2007/050391.

Andrieu C. et al., "Particle Methods for Change Detection, System Identification, and Control" Proceedings of the IEEE, New York, US, vol. 92:3, Mar. 2004, pp. 423-438.*

Greenfield et al., "Adaptive Control of Nonlinear Stochastic Systems by Particle Filtering" Control and Automation, 2003. ICCA. Final Program and Book of Abstracts. The Forth International Conference on Jun. 10-12, 2003, Piscataway, NJ, USA, IEEE, Jun. 10, 2003, pp. 887-890.*

European Patent Office, International Preliminary Report on Patentability and Written Opinion, Jan. 13, 2009, from International Patent Application No. PCT/GB2007/050391, filed on Jul. 10, 2007.

U.K. Patent Office, Search Report, Mar. 20, 2007, from related UK Patent Application No. GB0613955.4, filed Jul. 13, 2006.

* cited by examiner

CONTROLLER FOR PARTIALLY OBSERVABLE SYSTEMS

RELATED APPLICATION INFORMATION

This application is a United States National Phase Patent Application of, and claims the benefit of, International Patent Application No. PCT/GB2007/050391 which was filed on Jul. 10, 2007, and which claims priority to British Patent Application No. 0 613 955.4, which was filed in the British Patent Office on Jul. 13, 2006, the disclosures of each of which are hereby incorporated by reference.

FIELD OF THE INVENTION

The present invention relates to the control of systems and in particular, but not exclusively, to optimised controllers designed to operate with at least partial autonomy in environments in which it is not possible to fully determine the state of the relevant system, defining the scope of that part of the environment to be controlled, on the basis of sensor measurements.

BACKGROUND INFORMATION

Optimal control of systems that are only partially observable, that is, where the state of the system may be only partially determined through available measurements (observations) of the environment, continues to be an active area of research. This so-called "partial observability" arises from such causes as (for example) sensor inaccuracy or more significantly, the lack of an appropriate sensor for a state that is relevant to an action that the controller may initiate. Such conditions are likely to occur, in particular, in relatively unstructured environments in which the system to be controlled is a small part of a large scenario containing other equally autonomous entities that were not specifically designed to match the capabilities of the controlled system. With an expected increasing use of robotic systems in all walks of life (automated border surveillance, unmanned crop spraying in agriculture, mapping of intestinal tracts using autonomous surveillance 'pills', for example), such conditions are of increasing importance and there are many potential applications for this technology.

A key requirement in controlling these systems is an ability to react reasonably to a very broad range of external disturbances, using very limited sensor information, particularly where the disturbances are likely to be responsive to an action of the controller. For example, in aerial crop spraying there might be a need to avoid bird-strike, but the action of traversing the whole area of a crop to be sprayed will necessarily lead to birds taking flight from the crop: the birds may not be visible on the crop but experience in the form of a model of bird behaviour might be used to define best patterns of spraying to minimise the incidence of bird-strike.

An approach to addressing this realm of problem is provided by optimal control theory. The fundamental equations providing a recursive solution to this general problem are the Hamilton Bellman equations, as described for example by R E Bellman in "Dynamic Programming", Princeton University Press, (1957). These equations can be solved exactly only in a restricted range of relatively simple control problems.

For linear systems in particular, where performance measures are quadratic and where any noise arising in observations of the environment are assumed to be Gaussian in nature, Goodwin and Kwai Sang Sin (*Adaptive Filtering, Prediction and Control*, Prentice Hall (1984)), for example, describe a method for controlling a system comprising estimating the states of the system, on-line, using a Kalman filter and using these state estimates in a full state feedback controller that has been designed separately from the state estimation process. This method involves an off-line solution of a set of Riccatti equations very similar to those of the Kalman filter itself. While this process leads to an elegant solution to the associated control problem, the assumptions that are needed to obtain the solution are rarely satisfied in a real systems.

In more realistic situations it is not possible to invoke the 'separation principle' that allows the controller and state estimation to be separately solved for. Such a separation enables both the estimation and control to be expressed compactly in terms of separate pre-computed gain factors. Without this separation, the optimal control depends on the results of observations and not just on an instantaneous error estimate. Because of this intimate coupling the usual approach to the design of controllers for such complex systems, characterised by nonlinear sensors and dynamics and correspondingly non-Gaussian statistics, (for example as described by D. Karagiannis, R. Ortega, and A. Astolfi in "Nonlinear adaptive stabilization via system immersion: control design and applications", *Lecture Notes in Control and Information Sciences*, Springer-Verlag, Berlin, 311, pp. 1-21 (2005)) is to completely avoid state estimation and to directly design a controller on the basis of an analysis of the dynamics of the controller system.

While this approach is sufficient for control, it does not provide for an interpretation of the control actions that were taken. This is not a serious issue for a closed autonomous system, but if such a system is linked to collaborating human operators undesirable behaviours can result simply because, without the system controller providing an explanation for its robotic actions, the human collaborator can end up counteracting them. Pilot-induced oscillation is an example of this phenomenon.

In the case of a linear system in which the states of the system can be defined by discrete values that are directly observed, the optimal control problem is just that of the well-known 'travelling salesman' problem that is NP Complete, that is, the time taken to obtain a general solution is known to scale faster than any polynomial of the number of states. Nonetheless, at least, in the case of an effectively finite horizon, a number of algorithms are known that enable practical approximate solutions to be obtained in which the control algorithms are solved either off-line or iteratively improved as control actions are taken. These methods are generally described within a framework of Markov Decision Processes (MDPs) that comprise a Bayesian network model representing states and measurements of the system, augmented with control actions and performance measures. Within this model, a probabilistic link between a state and a measurement is termed a measurement model and the links between the states at different times constitute a model of the system dynamics. This dynamics is parameterised by the controller action and the performance of the system is monitored by rewards that are (possibly stochastic variables) conditional on the states of the system. Given this probabilistic structure, the benefits of particular control actions can be accumulated in a net return function. Choosing the actions so as to optimise the net return in the long run provides the route to design of an optimal controller.

In the case of an MDP system with discrete-valued states, the Hamilton Bellman equation, referenced above, is a matrix equation in the discrete state space and solutions for optimal control are obtained by iteration of this matrix equation. The individual iterations involve matrix multiplication that is polynomial in the number of states, so that provided a finite horizon can be assumed, a whole solution can be found approximately in polynomial time. In the textbook "Reinforcement Learning—an Introduction", by Sutton R S, and Barto, A G., MIT Press, Cambridge Mass., (1998), Barto and Sutton describe a number of different methods for solving such discrete state decision problems.

In the general case where not all states are "well observed", that is, where it is not possible to determine all the states of a system with certainty on the basis of observations, control problems need to be solved by means of what is referred to as a Partially Observed Markov Decision Process (POMDP). In this case the MDP solution techniques mentioned above are not practicable. Although the same MDP approach is equally valid when states are not well observed, the resulting equations involve integrals over the probabilities of states rather than sums over the states themselves. These equations are not exactly solvable and even the known approximate solutions (for example the "Witness" algorithm) are not guaranteed to be polynomial.

The Witness algorithm, developed by Kaelbling et al. and described for example in Anthony R. Cassandra, Leslie Pack Kaelbling, and Michael L. Littman, "Acting optimally in partially observable stochastic domains", *Proceedings of the Twelfth National Conference on Artificial Intelligence*, Seattle, Wash., (1994) is difficult to use in practice, if only because its tractability is difficult to gauge, a priori. In this algorithm, the integral problem referred to above is converted into a discrete problem by assuming the global benefit function to be piece-wise linear. This assumption is consistent with the form of the fundamental Hamilton Bellman equation but this does not place a restriction on the number of linear facets that might result in the solution. Here the solution time is polynomial in this number of facets, but since it is possible for the number of facets to be indefinitely large, the solution may still be non-polynomial.

In practice, this might not be a serious limitation if the controller design is performed off-line, since it may be possible to adjust the effective horizon of the solution so as to obtain a reasonable solution in a practicable time. However, the method does have the undesirable feature that the number of facets and hence the computational time only emerge as the solution process proceeds. This means that at best the approach is limited to off-line controller (decision-maker) design.

The Witness algorithm approach does have the advantage that it addresses the issue of providing both optimal control actions and optimal estimation of the system state, giving a rational for the actions. In contrast, recent work by MacAllester and Singh ("Uncertainty in Artificial Intelligence", vol. 5, p 409 (1999)) takes an approach analogous to that of Karagiannis et al., referenced above, in conventional control and avoids the state estimation entirely by seeking control solutions for the POMDP problem directly in terms of histories of measurements. As noted previously, such an approach makes difficult the integration of multiple levels of control, particularly those involving interactions with human players.

Although partial observation leads to a problem for which there is no known approach providing a solution that can be made arbitrarily accurate, there are many situations where the lack of complete observability has few consequences and it is possible to obtain an approximate solution by solving the completely observed case and then looking for a perturbation solution by considering fluctuations around this classical solution. For a continuous state space, this is the Laplace approximation.

There have been recent attempts to extend this approach by allowing multiple classical paths. In particular, in H. J. Kappen, "Path integrals and symmetry breaking for optimal control theory", arXiv: physics/0505066 4 (2005), Kappen has addressed this extension by sampling over the system trajectories from the neighbourhoods of all the classical optimal solution paths. In this approach the optimally controlled path is obtained by averaging over samples of likely paths, with appropriate likelihood weightings. This approach loses the potential advantages of a recursive formulation that would allow on-line optimisation and it also avoids the need to compute estimates of the states. While the latter might be seen as an advantage, it is not if there is a need to 'understand' the controlled actions of an autonomous robotic system.

SUMMARY OF THE INVENTION

From a first aspect, the present invention resides in a controller, operable to control a system on the basis of measurement data received from a plurality of sensors indicative of a state of the system, wherein the controller comprises:

a system model, defining at least a set of probabilities for the dynamical evolution of the system and corresponding measurement models for the plurality of sensors of the system;

a stochastic estimator operable to receive measurement data from said plurality of sensors and, with reference to the system model, to generate a plurality of samples each representative of the state of the system;

a rule set corresponding to said system model, defining, for each of a plurality of possible samples representing possible states of the system, information defining an action to be carried out in the system; and an action selector, operable to receive an output of the stochastic estimator and to select, with reference to the rule set, information defining one or more corresponding actions to be performed in the system.

A controller according to this first aspect of the present invention is particularly suited to effecting optimal control of a system subject to uncertainty, that is, to one in which the sensor data or other measurements of the system's operating environment are insufficient to provide an accurate determination of the state of the system (comprising either or both of the external environment and the autonomous system itself). The controller is operable to execute preferred algorithms to determine control actions to be taken in the system on the basis of imperfect observations of the environment, as represented at least in part by the sensor data. Preferably, there is a pair of algorithms, the first for mapping observations onto control actions and the second for determining the structure of the mapping function.

Advantageously, a controller according to preferred embodiments of the present invention provides, in particular, a method for approximate solution of the Hamilton Bellman equations, referenced above, that would be applicable in a broader range of situations than merely a restricted range of simple control problems. The method is based on the general 'Dynamic Programming' approach to optimal control of Markovian systems. This is a general principle underpinning the optimal control concept but because of its complexity it is impractical to implement in real applications. However, in preferred embodiments of the present invention, a new method is provided, based on this general principle, that allows for its practical application. A key part of this new method is that of estimating the state of a system on the basis of observations.

Preferably, a conventional statistical sampling approach is used to construct the necessary estimation filter and the innovation of this invention lies in the use of these statistical samples in the construction of the controller.

A controller according to preferred embodiments of the present invention may be used for both continuous and discrete systems but it achieves a particularly efficient form for discrete automatic control and decision-making.

Preferred embodiments of the present invention are motivated by the needs of autonomous robotic systems where it is envisaged that such autonomous systems will need to co-ordinate their actions with those of human participants. Thus an advantageous feature of a controller according to the present invention is that of providing both control and a consistent estimation of the system state so that the robotic behaviour of the controller can be understood by human collaborators.

Potential applications of a controller according to preferred embodiments of the present invention range from the control of autonomous vehicles to the control of security and financial systems, for example.

In a preferred embodiment of the present invention the measurement data define a state of the system. Alternatively, or in combination, the measurement data are indicative of a predefined probability that the system is in a given state.

In a controller according to further preferred embodiments of the present invention, the action selector is operable to generate a plurality of recommended sets of actions and associated weighing factors and to select at least one of said actions stochastically with probability proportional to said weighting factors.

The following preferred features fall within the scope of preferred embodiments of the present invention:
1) the 'sample state representation' comprises separate sample sets, each from partitions of the original state space, and the rule set and action selector functions comprise separate rules and selectors for the separate partitions;
2) the rule set is organised in terms of clusters of sample states with the same actions (with the advantage that less data need be tabulated) and the action selector operates on the clusters rather than the distinct sample states; and
3) the rule set is updated in the course of operation of the controller, by making use of the observed statistics of the responses to the control actions, to either implicitly or explicitly update the system dynamics and thereby allow an iterative adaptation of the control rules using the Hamilton Bellman equation, referenced above.

DETAILED DESCRIPTION

Embodiments of the present invention will now be described in more detail, and by way of example only, with reference to the accompanying drawings.

An overview of a controller according to preferred embodiments of the present invention and its interface to a system to be controlled will now be described with reference to FIG. 1.

Figure 1:
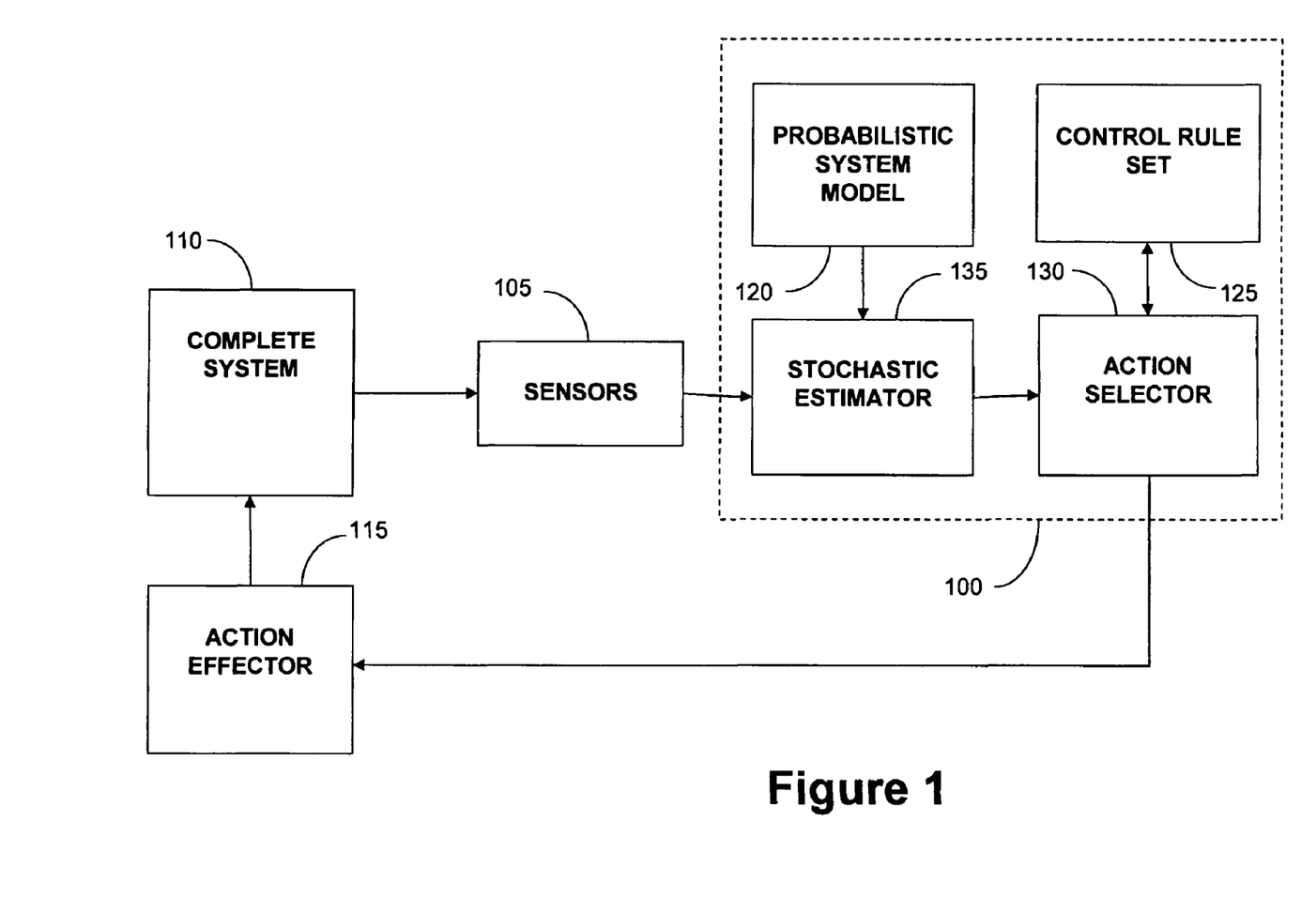
FIG. 1 is a diagrammatic representation of a controller, including its interface to a system to be controlled, according to a first preferred embodiment of the present invention.

Referring to FIG. 1, a controller 100 is arranged to receive input from a number of sensors 105 which in turn are arranged to monitor or measure various parameters representative of behaviour or operation of a system to be controlled 110. An action selected by the controller 100 as a result of having received input from the sensors 105 is notified to an action effector 115, for example in the form of a demand that is interpreted by the action effector 115 and implemented by or under the control of the action effector 115 on the system 110.

The controller 100 comprises a probabilistic model 120 containing data representing the dynamics of the system 110 to be controlled, preferably in the form of a set of conditionally dependent transition probabilities. Simple examples of such probabilistic system models 120 are provided in Annex A below. The controller 100 further comprises a control rule set 125 that is populated during a design phase, to be described below, and which contains rules defining actions that may be selected by an action selector 130 during operation of the controller 100. Rules stored in the control rule set 125 are defined, preferably, on the basis of so-called "sample states" defined as being a set of samples from the probability of the state of the system model 120, intended to provide a sufficiently accurate description of the system 110, to be controlled.

The controller 100 further comprises a stochastic estimator 135, the detailed operation of which will be described in detail below, operable to receive, as input, data from the sensors 105 and on the basis of those data and of data stored in the probabilistic system model 120 to output sample states to the action selector 130. The action selector 130, on receiving a sample state from the stochastic estimator 135, interrogates the control rule set 125 and determines an appropriate action, so generating a demand which is output to the action effector 115.

A particularly advantageous feature of the controller 100 according to preferred embodiments of the present invention is the formulation of a control problem in terms of discrete states that are constructed as "sample states" to be directly accessible by observation. In this way the control problem is converted into an equivalent (fully observed) Markov Decision Process that may be solved by conventional means while simultaneously providing a direct link between the best estimation of the state of the system and the selection of the best control action. Advantageously, this direct link enables visibility of a rationale for actions initiated by the controller that will ease integration with humans, or other entities operating in the same environment, of an autonomous system comprising such a controller according to preferred embodiments of the present invention. This visibility is provided through sample-states that are an appropriate and conventional output of the stochastic estimator 135. With the control rule set 125 based directly on the sample states, the control and estimation use the same state representation, enabling efficient implementation of the controller 100. Because these representative sample states are directly observable, there is the possibility of immediate feedback from the observed consequences of the control process implemented by the controller 100. That is, following implementation of any control action selected by the controller 100, the resulting (observed) state of the system 110 can be compared with that expected on the basis of the predictions of an MDP 'sample-state' dynamic model for the system 110. This allows, in a preferred embodiment of the present invention, for the possibility of adaptive design of the controller or decision-maker, whereby the dynamic model of the system 110, as represented at least in part by the probabilistic system model 120, is updated on-line to reflect the observed dynamical behaviour of the system 110. Such adaptability is likely to be particularly advantageous in autonomous decision-making where system models are not likely to be sufficiently well known in advance to allow off-line design of the optimal decision function of a controller 100.

A difficulty inherent in systems that do not assume linear dynamics and Gaussian noise processes is a strong coupling of the state estimation and controller design. In such a regime, the state estimation is difficult in its own right and it is generally necessary to resort to some statistical sampling method to enable an approximate solution. The key technical innovation in preferred embodiments of the present invention is to use these statistical samples of the state probabilities, i.e. sample states, as an approximate 'sufficient statistic' for the design of the action selector 130. The sample state is the set of a sufficient number of statistical samples of the estimated state provided by the stochastic estimator 135 and which are then the state signals output by the stochastic estimator 135 and used by the action selector 130 to select a relevant action according to the control rule set 125.

Statistical sampling methods that are used for state estimation as performed, preferably, by the stochastic estimator 135 are frequently called 'Particle Filters' and each sample (or particle) is essentially an unbiased sample from a set of events that might have occurred in the environment in which the autonomous subsystem operates, given an imperfect knowledge of the system provided by the available observation data, e.g. sensor data output by the sensors 105. Such a Particle Filter is effectively a multiple hypothesis estimator providing a best estimate of the state of a system at any time, as a mean over the outcomes of the sample of hypotheses. More detailed information on particle filters is provided in A Doucet, N de Freitas, N Gordon, *Sequential Monte Carlo Methods in Practice*, Springer-Verlag New York (2001) and will not be described further in the present specification.

It would not be immediately obvious to a person of ordinary skill that such a multiple hypothesis description could be used to decide the appropriate control actions to take by a controller since only one control action can be taken, no matter how diverse are the state hypotheses. Preferred embodiments of the present invention therefore consider the control actions to be a function of the sample state, namely the predetermined number of "particles" sampled, by the stochastic estimator 135, from the probability of the states, as defined in the system model 120, rather than any particular sample or the mean of possible samples. In this way, rather than considering the general case of the control actions being functionals of the probability densities of the states, in preferred embodiments of the present an approximate representation is provided as a function on the space of finite samples from the probabilities of the states. Just as in the case of state estimation, it is appropriate to consider a fixed number of samples so that the mapping from sample-set to control actions has fixed dimensionality. This immediately results in an attractive feature of an algorithm based on this approach: the size of the computational problem is fixed only by the chosen number of particles to be used in the description.

In particular, the execution speed of the algorithm is not dependent on the complexity of the system model or on the degree of uncertainty of the states and this number of particles (statistical samples) can be chosen a priori in order to provide a practicable execution speed.

In its basic form the invented algorithm involves a discrete state space description of the system. This description comprises a measurement model and a model of the system dynamics, of the form needed in a conventional MDP or POMDP algorithm.

The algorithm effects control of the system in order to maximise the mean expected return function along the state space trajectory of the system as the sum of individual rewards accumulated as a function of the state and the actions at each time step along the path in accord with the general Dynamic Programming approach for MDP systems.

In common with general POMDP and MPD algorithms, the algorithm implemented by a controller 100 according to preferred embodiments of the present invention involves two phases. Firstly an optimal control function or rule set 125 is obtained as a function of what can be known of the state of the system. Secondly the optimal control is effected by inferring the best information on the state of the system from measurement data and using the computed control function to obtain the required control action.

Preferably, the optimal control rule is designed off-line in a design phase and incorporated as a 'look-up' function in the control rule set 125 that is used by the action selector 130 to provide the optimal decisions as measurements are made by the stochastic estimator 135 as to the state of the system 110. However, in a preferred embodiment of the present invention, for a more efficient implementation, a controller 100 initialised in this way may be sequentially updated at the same time as it is exploited.

A particularly innovative feature of the algorithm implemented in a controller 100 according to the present invention is the expressing of the knowledge of the current state of the system 110 in terms of some number (N) of samples of the likely states of the system from the probabilities of these states obtained as a result of measurements (the sensor data and any other observational inputs). Using this set of N "samples of likely states" or particles, a new, subsidiary MDP is constructed where the sample sets are the approximate sufficient statistic for the problem and these sample sets are taken as the 'states' of this subsidiary MDP. Clearly, the number of samples is exponentially larger than the original number of states but by limiting the number, N, this space can be limited to a practicable size. For example, if there were originally 16 states, then there are 816 sample-states for N=3. Here it should be noted that although it would be reasonable to increase the number of samples with larger numbers of states, the choice of the number of particles is more a matter of sufficiently exploring the likely variability of the system than exploring all possible states and therefore it is reasonable to have the number of samples much less than the number of states.

In order to implement this MDP, it is necessary to define during the design phase for controller set-up a Sample-State Markov Decision Process (SSMDP) representing the corresponding dynamics of the sample-states and the associated measurement models. These are obtained by conventional Bayesian statistical inference and conditioning on the possible samples. This process is computationally demanding and preferably is performed off-line and need only be done once. (See for example, A Doucet, N de Freitas, N Gordon, *Sequential Monte Carlo Methods in Practice*, Springer-Verlag New York (2001).)

Having constructed this (SSMDP), the solution of the state estimation, the controller design and the implementation of the control can be effected using any MDP solution algorithm. Here it should be noted that MDP algorithms are very much faster than POMDP algorithms and in particular example problems the algorithm according to preferred embodiments of the present invention provides an approximately optimal controller solution indistinguishable from that obtained using the 'Witness' algorithm for POMDPs (referenced above) in less than a thousandth of the computational time.

It should be noted that for a large number of states, the state estimation process itself might be implemented by sampling so that the samples used in the state estimation would naturally be the same samples used in the control.

Given the conceptual simplicity of the approach used in the present invention, it is possible to imagine a number of extensions of the algorithm. In particular, it might be extended to continuous state spaces by describing the probability densities of the states in terms of Gaussian mixture models such that the state estimation problem becomes tractable as a Rao-Blackwellised Particle Filter in which samples are drawn from the discrete space used to generate the admixtures of Gaussians It is then appropriate to take a similar factorisation of the control actions into discrete demands and continuous control actions to meet them. The discrete components limit the control problem to a set of mono-modal control problems where continuous control actions can be solved for using traditional controller designs. The expected returns of these continuous controllers then become the reward functions of the discrete control problem which can then be solved using the sampling technique of the present invention.

Preferred embodiments of the present invention are directed to the problem of estimating the states of the system 110 on the basis of relatively meagre sensor data (105) and using this knowledge to infer an optimal decision path. Whatever the structure of the mathematical description, the result will simply be a mapping from sequences of observations to possible actions. This might be constructed as a heuristic neural network function fitting problem. The approach taken in preferred embodiments of the present invention is to represent the problem in a complete probability space of underlying dynamical states, measurements, decisions and rewards and impose a causal model structure by means of a Bayesian network expressing the joint probability of all these states in terms of a conditional probability factorisation. This structure is shown in FIG. 2.

Figure 2:
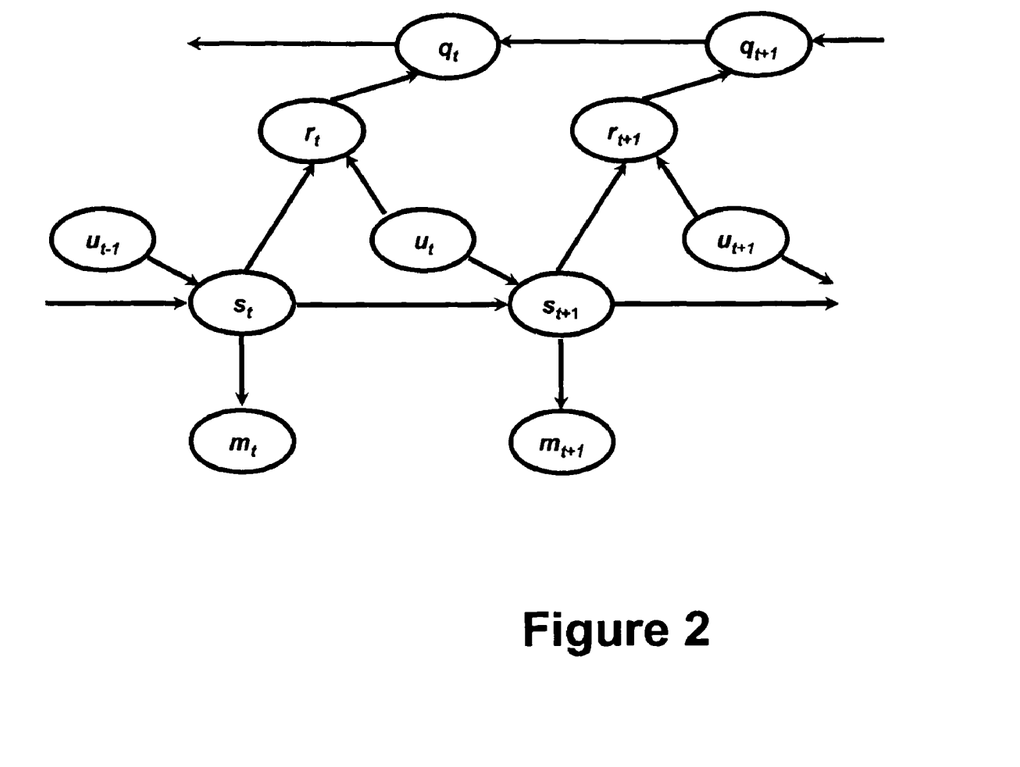
FIG. 2 is a representation of a probabilistic model for a complete system to be controlled, in the form of a Bayesian network.

Referring to FIG. 2, a model structure is shown representing the relationships between separate variables in the form of separate conditional probabilities associated with subsets of those variables. It is just such factorisation that allows more complex models to be constructed from simpler component parts. The diagram in FIG. 2 expresses the joint probabilities of all the states of interest in the respective generic decision problem. All the variables pictured in FIG. 2 are vectors in the relevant phase spaces and specifically:

The system states, $s_t$, are determined by a hidden Markov process such that the states at time 't' are influenced by only the states at the previous time.

Measurements, $m_t$, are made of these system states and although the system states are the only stochastic variable determining the measurements, there is no assumption that all states are measurable.

Predetermined decisions, $u_t$, are made that effect the temporal evolution of the system states. In general these are defined in terms of prior probabilities of decisions at each time but in this exposition we consider only 'pure strategies' without stochastic spread. (The approach can be readily extended to the case of mixed strategies.)

The benefit of the decision action is given by an immediate reward, $r_t$, that depends both on the resulting state and the decision that resulted in the state being achieved.

The total performance of the decision system is the net return, $q_t$, and this is accumulated from the immediate local rewards. It is this accumulation of rewards that enables a decision system to provide a decision strategy that gives due weight to future rewards relative to the immediate benefits from actions.

From this description it is relatively straightforward to construct a recursive estimate of the states of the system given previous measurements and a corresponding recursive estimate of a net return from future rewards. Assuming discrete states, the recursive probability of the state at time t+1 given all the measurements up to that time is:

$$b_{t+1}(s_{t+1}) \equiv P(s_{t+1} \mid U_t, M_{t+1}) \qquad (1)$$

$$= \frac{\sum_{s_t} P(m_{t+1} \mid s_{t+1}) P(s_{t+1} \mid s_t, u_t)}{\sum_{s_t s'_{t+1}} P(m_{t+1} \mid s'_{t+1}) P(s'_{t+1} \mid s_t, u_t)} P(s_t \mid U_{t-1}, M_t)$$

in the notation where capital letters denote sets of all previous states, e.g. $M_t = \{m_\tau : \tau \leq t\}$ In a similar fashion a recursive equation for the net return, can be used to determine the mean return:

$$\hat{q}(s_t, \{u_t\}) = \qquad (2)$$

$$\hat{r}(s_t, u_t) + \beta \sum_{s'_{t+1}} P(s'_{t+1} \mid s_t, u_t) \sum_{m_{t+1}} P(m_{t+1} \mid s_{t+1}) \hat{q}(s'_{t+1}, \{u_{t+1}\})$$

To achieve optimal performance the decisions, $u_t$, need to be made which maximise this return. If this is done then the Hamilton-Bellman equation for the optimal decision making process, which for fully observed states ('m≡x') gives the usual equation for the optimal actions in a Markov Decision Process (MDP), is:

$$q*(s_t, u_t) = \hat{r}(s_t, u_t) + \beta \sum_{s'_{t+1}} P(s'_{t+1} \mid s_t, u_t) v*(s'_{t+1}) \qquad (3)$$

where v* is the maximum mean reward obtained for optimal future decisions and q* is the corresponding reward for taking a particular decision and subsequently following optimal decisions. Maximising q* over these first decisions gives v* and the optimal decision itself.

All this is true whether there is a fully observed Markov decision process or whether the measurements are insufficient to provide complete knowledge of the system states. However, in the latter case, $q*(s_t, u_t)$ in equation (3) does not provide very useful information since it would not be possible to know the value of $s_t$ that should be used in evaluating it.

For a partially observed Markov decision process (POMDP) where the available data does, at best, give only a probability for the state values and the correspondingly observable net return is a function of the probability of the states rather than of the states themselves:

$$\theta*(b_t, u_t) = \hat{\rho}(b_t, u_t) + \beta \sum_{m_{t+1}} P(m_{t+1} | b_t, u_t) v*(b_{t+1}) \qquad (4)$$

where $b_{t+1}$, defined by equation (1), is an implicit function of the state measurement $m_{t+1}$. This equation can be obtained from equation (2) simply by taking the mean of the equation relative to the known probability of the states given by equation (1). Equation (4) is then obtained by maximising net return over the possible decisions. It should be noted that this is not the probability-weighted mean of equation (3) since the maximisation needs to be performed after the mean is taken. Clearly the optimum decision can only be made on the basis of the available information.

Although, at first sight, this is formally identical to the case for an MDP, even for discrete states, the returns are now functions of a continuous probability. Thus despite the formal similarity, solving equation (4) is very much harder than the problem posed by equation (3). Nonetheless, a variety of known approaches have been used.

For discrete states, Cassandra et al, in "Acting optimally in partially observable stochastic domains.", Proceedings of the Twelfth National Conference on Artificial Intelligence, Seattle, Wash., (1994), have proposed the so-called Witness algorithm based on approximating v* as a piecewise linear function.

For continuous states, Kappen H J, in "Path integrals and symmetry breaking for optimal control theory.", arXiv: physics/0505066 4 (2005) takes a statistical physics approach based on a path integral formulation, obtaining the return as a probability weighted sum of viable decision paths.

In the present invention, a somewhat different approach has been taken, addressing the case of discrete states but having an obvious extension to continuous states as well.

Equation (4) provides a complete description of optimal decision-making in the context of partially observed Markovian systems. The result was obtained on the assumption of discrete system states but it remains formally correct even for continuous system states. It also reduces to the MDP case of equation (2) in the case where all the states are explicitly observed. Moreover, the case where some states are fully observed but others are not, presents no particular difficulties.

Although equation (4) is conceptually simple, for anything other than simple low-dimensional problems, direct iteration of equation (4) will converge too slowly to be useful. This can be seen by noting that the equation updates the continuous function v* at a single point in the high dimensional space with as many dimensions as there were discrete states. Thus it would generally take an indeterminately large number of iterations of equation (4), for the iteration to converge. It is immediately clear that equation (4) is very far from being a recipe for finding a solution for an optimal controller.

Previous methods have addressed the practical solution problem by representing the mean net value functions q and v in some parametric form.

In the Witness algorithm, referenced above, these functions are represented by piecewise linear functions. This is clearly an appropriate assumption. The reward function, $\hat{\rho}(b_t, u_t)$, is the probability weighted mean of the state-dependent rewards of equation (2) with the obvious consequence that the individual rewards are indeed linear functions of the probability of the state. Thus, provided the iteration converges in a finite number of steps, the resulting value functions will necessarily be piece-wise linear functions. This assumption is therefore equivalent to assuming that a good approximate solution can be obtained using a finite horizon. In the conventional control literature, for example in "Multi-valued Control Problems and Mixture Density Network.", IFAC International Conference on Intelligent Control Systems and Signal Processing, ICONS 2003, Editor: A. E. Ruano, 2, pp 387-392 (2003), this same approximation is often found to be justified.

The Witness algorithm has been implemented for simple models where it often provides good performance. For more complex (higher dimensional) problems it can produce very slow performance in an unpredictable way. The essence of this difficulty is that fact that although the linear assumption ensures a finite search for a solution the method does not predetermine the number of linear facets needed to provide a solution. These are determined only in the course of iteration and if there are a large number, then convergence will be slow.

As noted above, the approach taken in preferred embodiments of the present invention is somewhat different. The essence of the decision problem is the issue of a joint state-estimation and decision-making. It is therefore appropriate to consider an approach to the decision problem that is closely related to the practicable state estimation methods.

An essential feature of the problem-space is the potentially very large number of states with solutions that nonetheless occupy only a very small part of that space. That is, the probability functions will be sparse with many possible states having near zero probability. Despite this, it is not possible to reduce the dimensionality of the space because as crucial information becomes available the relevant part of the probability space will change radically. For example, in an airport security system, the sensing of explosives on a potential passenger will immediately change the perception of the situation and the actions that need to be taken.

For the state estimation part of the problem, an appropriate approach is provided by statistical sampling. This is the analogue of the Particle Filter used in problems with continuous states as described for example in "Sequential Monte Carlo Methods in Practice", by A. Doucet, N. de Freitas and N. Gordon, Springer-Verlag, New York (2001). In the Particle Filter, the infinite number of possible states corresponding to the continuous states is represented by a finite set of samples of the states taken in proportion to their probability densities. In the case of discrete states exactly the same approach can be used, taking similar unbiased samples from the discrete probability functions in proportion to the probabilities.

In this discrete Particle Filter approach the state probability is represented by a finite set of N samples:

$$P(s_t | U_{t-1}, M_t) = \sum_{t=1}^{N} 1/N \delta(s_t, s_i(U_{t-1}, M_t)) \qquad (5)$$

where $U_t$ is the set of all actions, $u_t$, at times at least as early as t.

Given the approximate state probability of equation (5), the calculation of subsequent probabilities (at times greater than t) proceeds by sampling over the possible transition dynamics and importance weighting by the measurement probabilities. The sampling over the dynamical update transition matrix, $P(s_{t+1}|s_t,u_t)$, clearly expands the number of samples in the updated state probability. If there were $N_s$ samples taken of the dynamics then there are $N \times N_s$ particles after updating.

The final stage of the estimation update process is 'resampling' whereby N samples are taken (with replacement) from this expanded set. This is the standard particle filter approach, without invoking any measures (such as residual resampling) to reduce the noise of the sample. The result is an approximation to the updated probability of the states that has the same form as equation (5) and the update algebra closes. More detail is available with reference to "Sequential Monte Carlo Methods in Practice.", by A. Doucet, N. de Freitas and N. Gordon, Springer-Verlag, New York (2001).

Writing $S_t = \{s_i(U_{t-1}, M_t), \forall i \in \{1, \ldots, N\}\}$ as shorthand for the sample at time t, then $S_t$ is a sufficient statistic for approximate state probability of equation (5) in the sense that $S_t$ contains all the information to allow the construction of any statistic that could be obtained from the probability given in equation (5). Thus, without invoking any additional approximation, in place of equation (4) can be written a representation of the optimal decision process that is consistent with the representation of the state probability given by equation (5):

$$\Theta * (S_t, u_t) = P(S_t, u_t) + \beta \sum_{m_{t+1} S_{t+1}} \Pi(m_{t+1} S_{t+1} | S_t, u_t) Y * (S_{t+1}) \quad (6)$$

Here P is the reward weighted by the approximate probability of equation (5) and Y is the associated best net return. It is a relatively straightforward process to obtain an expression for the immediate reward:

$$P(S_t, u_t) = \sum_{s \in S_t} 1/N r(s, u_t)$$

The update matrix, $\Pi(m_{t+1} S_{t+1} | S_t, u_t)$, can also be constructed with a little thought from the basic state transition matrix and the measurement probability. The essential steps are as follows. Note that, using Bayes theorem, for a given measurement $m_{t+1}$:

$$P(s_{t+1} | S_t, m_{t+1}, u_t) = \frac{\sum_{s \in S_t} 1/N P(m_{t+1} | s_{t+1}) P(s_{t+1} | s, u_t)}{\sum_{s'_{t+1}, s \in S_t} 1/N P(m_{t+1} | s'_{t+1}) P(s'_{t+1} | s, u_t)} \quad (7)$$

It is therefore a simple (if tedious) matter to construct the corresponding probability of a sample $S_{t+1}$:

$$\Pi(S_{t+1} | S_t, m_{t+1}, u_t) =$$
$$\frac{N!}{n_1! \ldots n_r!} P^{n_1}(s_1 | S_t, m_{t+1}, u_t) \ldots P^{n_r}(s_r | S_t, m_{t+1}, u_t) : S_{t+1} =$$
$$\{s_1^{n_1} \ldots s_r^{n_r}\}$$

The probability of the observation $m_{t+1}$ is obtained trivially from the sample:

$$P(m_{t+1} | S_{t+1}) = \sum_{s \in S_{t+1}} 1/N P(m_{t+1} | s) \quad (8)$$

bringing the final result:

$$\Pi(S_{t+1}, m_{t+1} | S_t, u_t) = \Pi(S_{t+1} | S_t, m_{t+1}, u_t) P(m_{t+1} | S_{t+1}) \quad (9)$$

Constructed in this way, equation (6) is the Hamilton-Bellman equation for the optimal decision-maker for a conventional 'fully observed' MDP with observation probability and transition matrix given by equations (8) and (9) respectively.

As a consequence of this transformation into an approximately equivalent MDP problem, the whole spectrum of conventional solution techniques for the MDP problem is immediately available. In particular, the method described above has been tested using the 'value iteration' solution method as described for example by R. S. Sutton and A. G. Barto, referenced above. This approach is the ideal for obtaining a full off-line solution that enables the decisions to be tabulated purely as a function of state sample. However, that although this will provide a good base-line for a decision-maker, it will almost certainly be advantageous to employ an on-line reinforcement learning stage that will update that part of the sample space that is explored in a mission. Barto and Sutton, as referenced above, provide a wide variety of such reinforcement learning approaches.

Note that any real mission will explore a very small fraction of a sample space and it is essential to start with base-line decision tables.

An overview of a design phase process that may be followed for the set-up of a controller 100 in respect of a particular system and a particular control problem will now be described with reference to FIG. 3 according to preferred embodiments of the present invention. The design phase process is preferably operated as an off-line process prior to on-line operation of the controller 100 and is designed to populate the probabilistic system model 120 and the control rule set 125 in respect of a particular system 110 and control problem. In practice, the design phase process is computationally intensive.

Figure 3:
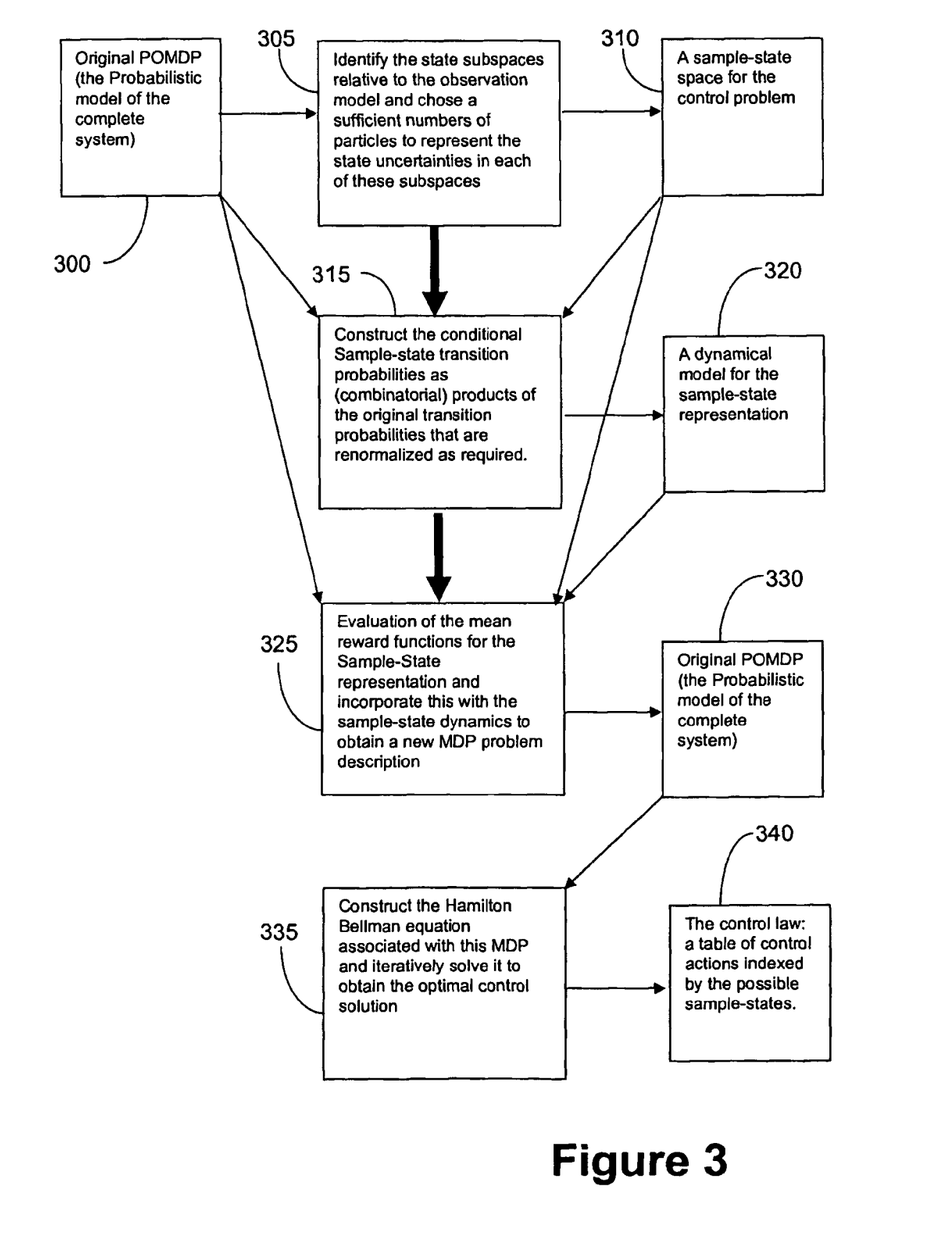
FIG. 3 is a schematic representation of a design phase process for a controller according to preferred embodiments of the present invention.

Referring to FIG. 3, the design phase process begins at STEP 300 with an original POMDP probabilistic model of the complete system 110 to be controlled. At STEP 305, using the original POMDP model from STEP 300, the state subspaces relative to the observation (measurement) model are identified and a sufficient number of particles is chosen to represent the state uncertainties in each of these subspaces, resulting (310) in the generation of a sample-state space for the particular control problem.

At STEP 315, using the original POMDP from STEP 300 and the sample-state space from 310, the objective is to construct the conditional sample-state transition probabilities as (combinatorial) products of the original transition probabilities that are renormalized as required. This results at 320 in a dynamical model for the sample-state representation—the probabilistic system model 120. The next step, STEP 325, is to use the original POMDP model (300), the sample-state space (310) and the dynamical model (320) in an evaluation of the mean reward functions for the Sample-State representation and incorporate this with the sample-state dynamics to obtain a new MDP problem description (330). This new MDP problem description (330) is then used at STEP 335 to construct the Hamilton Bellman equation associated with this MDP and to iteratively solve it to obtain the optimal control solution for the particular system 110 and so generate, at 340, a table of control actions indexed by the possible sample states. This table is the control rule set 125.

The control problems most relevant to preferred embodiments of the present invention arise in a wide variety of applications and for a broad range of operational requirements. These include the supervisory control of complex industrial plants, the flying of a commercial or military aircraft by a human pilot or autonomous controller augmented by subsidiary autopilots and the coordinated control of multiple robotic sensor platforms to track a target or to explore a terrain. The central issue in these distributed control systems is the need for co-ordination of separate control actions that are driven by a multitude of separate requirements.

As an example of such a situation, a supervisor in a nuclear power plant is required to maintain power output and to ensure safety. If the automatic controller of the control rods is seen to be inserting more moderating control rods, and reducing the power output, the optimal decision of the supervisory system to countermand the action or accept it will depend on the reason for the action of the automatic controller. If the cause is a belief that the temperature of the core is likely to rise because the coolant flow has failed then the supervisory action needs to be very different to the contrary case when a failure of the temperature sensor is the cause of the automatic action.

In the case of a high performance manned aircraft or racing car in which the overall control is the product of control outputs from a pilot or driver and associated outputs from some auto-pilot or traction control system, similar conflicts arise. These conflicts can only be resolved if the (automated or human) drivers or pilots can understand the causes for the preferred actions of the automatic system and adjust the their outputs on an understanding of how the automatic system will respond. Without such situation awareness, the well-studied phenomenon, 'Pilot induced oscillation' is known to occur These examples are all essentially non-linear, resulting in control problems in which it is not possible to factorise the problem into a set of smaller problems that can be solved independently. Thus, in the nuclear power station, it is not possible to provide control that is based on the optimal supervisor and a separately designed optimal automatic controller. This may not be too serious if most of the subsystems are intelligent humans but it is more difficult in the case of multiple UGVs (unmanned ground vehicles) attempting to track a potential threat. If the threat may be behind a building and the first of a pair of UGVs circles left-wise round the building then the best action of the second UGV will depend on the reasons for this action and not just on the observation of the action itself. For example the first UGV might have seen the threat seeking cover behind the building or this might just be the shortest route to another possible location of the threat.

Because of the complexity of these high dimensional problems and the fact that provision of the estimates of the states of the system, that represent the reasons for the control actions, cannot be separated from the control problem itself, current best practice recommends direct solution of the control problem without solving for the rationale (the states of the system). The present invention provides a method that provides a state estimation (rationale) for the control actions and the control actions themselves, without any wasted effort in the sense that the state estimates are used directly in the selection of control actions.

The invention claimed is:

1. A controller, for controlling a system on the basis of measurement data received from a plurality of sensors indicative of a state of the system, wherein the controller comprises:
a system model and corresponding measurement models for the plurality of sensors of the system;
a stochastic estimator for receiving measurement data from the plurality of sensors and for generating, with reference to the system model, a plurality of samples each representative of the state of the system;
a rule set corresponding to the system model, defining, for each of a plurality of possible samples representing possible states of the system, information defining an action to be carried out in the system; and
an action selector, for receiving an output of the stochastic estimator and for selecting, with reference to the rule set, information defining one or more corresponding actions to be performed in the system;
wherein the controller is configured to:
(i) construct an initial partially observed Markov decision process (POMDP) model representing the dynamics of the system to be controlled, wherein the POMDP model comprises a representation of the states of the system, a measurement model, one or more control actions, and measures of benefit likely to arise from the selection of particular control actions;
(ii) transform the initial POMDP model into a subsidiary Markov decision process (MDP) model, comprising generating a sample state space representation for the subsidiary model, and generating an initial probabilistic system model and control rule set using the sample state representation; and
(iii) use observations of the system and of the environment by a plurality of sensors to update the control rule set and the probabilistic system model of the subsidiary MDP based upon the observed effects of selected control actions and with reference to the measures of the benefit system.

2. A method for controlling a system that enables autonomous operation of the system in an environment in which selected control actions have uncertain consequences, the method comprising:
(i) constructing an initial partially observed Markov decision process (POMDP) model representing the dynamics of the system to be controlled, wherein the POMDP model includes a representation of the states of the system, a measurement model, one or more control actions, and measures of a benefit likely to arise from the selection of particular control actions;
(ii) transforming the initial POMDP model into a subsidiary Markov decision process (MDP) model, including generating a sample state space representation for the subsidiary model, and generating an initial probabilistic system model and control rule set using the sample state representation; and
(iii) using observations of the system and of the environment by a plurality of sensors to update the control rule set and the probabilistic system model of the subsidiary MDP based upon the observed effects of selected control actions and with reference to the measures of the benefit system.

3. The method according to claim 2, wherein operation (ii) includes:
identifying a set of state subspaces, with reference to the measurement model;
choosing a number of samples sufficient to represent uncertainties in each subspace and, by statistical sampling and the application of a particle filter, generating a sample state space representation specific to a predetermined control problem;
calculating conditional sample-state transition probabilities by taking combinatorial products of the state transition probabilities from the initial POMDP model, renormalized as required, and generating a dynamical model based upon the sample state representation;
formulating one or more mean reward functions in terms of the sample state representation and combining the one or more functions with the state space representation and the dynamical model to redefine the predetermined control problem as an MDP subsidiary to the initial POMDP model; and
solving the subsidiary MDP using an MDP solution algorithm to obtain an initial optimal control solution for the system, and tabulating this solution to create the control rule set for the system.

4. The method according to claim 3, wherein operation (iii) includes:

constructing a recursive estimate of one or more states of the system given previous observations, and a corresponding recursive estimate of a net return from the benefits of future control actions;

identifying, based on the current sample state and the control rule set, one or more control actions that, once taken, impact the temporal evolution of the system states;

receiving an immediate reward, based upon a chosen one of the one or more control actions and the resulting state of the system, that represents the benefit of the chosen action, and an expected net return, calculated from the range of possible immediate rewards, representing an overall performance of the control system; and iteratively updating the control rule set and the probabilistic system model on the basis of the observed measurements, the received rewards, and the net return, to thereby refine the basis for future control actions in response to changes in the system and its environment.

5. The method according to claim 2, wherein operation (iii) includes:

constructing a recursive estimate of one or more states of the system given previous observations, and a corresponding recursive estimate of a net return from the benefits of future control actions;

identifying, based on the current sample state and the control rule set, one or more control actions that, once taken, impact the temporal evolution of the system states;

receiving an immediate reward, based upon a chosen one of the one or more control actions and the resulting state of the system, that represents the benefit of the chosen action, and an expected net return, calculated from the range of possible immediate rewards, representing an overall performance of the control system; and iteratively updating the control rule set and the probabilistic system model on the basis of the observed measurements, the received rewards, and the net return, to thereby refine the basis for future control actions in response to changes in the system and its environment.

6. A computer readable medium having a computer program, which is executable by a computer, comprising:

a program code arrangement having program code for controlling a system that enables autonomous operation of the system in an environment in which selected control actions have uncertain consequences, by performing the following:

(i) constructing an initial partially observed Markov decision process (POMDP) model representing the dynamics of the system to be controlled, wherein the POMDP model includes a representation of the states of the system, a measurement model, one or more control actions, and measures of a benefit likely to arise from the selection of particular control actions;

(ii) transforming the initial POMDP model into a subsidiary Markov decision process (MDP) model, including generating a sample state space representation for the subsidiary model, and generating an initial probabilistic system model and control rule set using the sample state representation; and (iii) using observations of the system and of the environment by a plurality of sensors to update the control rule set and the probabilistic system model of the subsidiary MDP based upon the observed effects of selected control actions and with reference to the measures of the benefit system.

7. The computer readable medium according to claim 6, wherein operation (ii) includes:

identifying a set of state subspaces, with reference to the measurement model;

choosing a number of samples sufficient to represent uncertainties in each subspace and, by statistical sampling and the application of a particle filter, generating a sample state space representation specific to a predetermined control problem;

calculating conditional sample-state transition probabilities by taking combinatorial products of the state transition probabilities from the initial POMDP model, renormalized as required, and generating a dynamical model based upon the sample state representation;

formulating one or more mean reward functions in terms of the sample state representation and combining the one or more functions with the state space representation and the dynamical model to redefine the predetermined control problem as an MDP subsidiary to the initial POMDP model; and solving the subsidiary MDP using an MDP solution algorithm to obtain an initial optimal control solution for the system, and tabulating this solution to create the control rule set for the system.

8. The computer readable medium according to claim 7, wherein operation (iii) includes:

constructing a recursive estimate of one or more states of the system given previous observations, and a corresponding recursive estimate of a net return from the benefits of future control actions;

identifying, based on the current sample state and the control rule set, one or more control actions that, once taken, impact the temporal evolution of the system states;

receiving an immediate reward, based upon a chosen one of the one or more control actions and the resulting state of the system, that represents the benefit of the chosen action, and an expected net return, calculated from the range of possible immediate rewards, representing an overall performance of the control system; and iteratively updating the control rule set and the probabilistic system model on the basis of the observed measurements, the received rewards, and the net return, to thereby refine the basis for future control actions in response to changes in the system and its environment.

9. The computer readable medium according to claim 6, wherein operation (iii) includes:

constructing a recursive estimate of one or more states of the system given previous observations, and a corresponding recursive estimate of a net return from the benefits of future control actions;

identifying, based on the current sample state and the control rule set, one or more control actions that, once taken, impact the temporal evolution of the system states;

receiving an immediate reward, based upon a chosen one of the one or more control actions and the resulting state of the system, that represents the benefit of the chosen action, and an expected net return, calculated from the range of possible immediate rewards, representing an overall performance of the control system; and iteratively updating the control rule set and the probabilistic system model on the basis of the observed measurements, the received rewards, and the net return, to thereby refine the basis for future control actions in response to changes in the system and its environment.

* * * * *